United States Patent [19]
Kuzuya et al.

[11] Patent Number: 5,491,648
[45] Date of Patent: Feb. 13, 1996

[54] ULTRASONIC MEASURING SYSTEM

[75] Inventors: Keiji Kuzuya, Kariya; Naoji Nakahara, Nagoya; Yasuyuki Aoki, Owariasahi, all of Japan

[73] Assignee: Aisin Seiki Kabushiki Kaisha, Kariya City, Japan

[21] Appl. No.: 187,507

[22] Filed: Jan. 28, 1994

[30] Foreign Application Priority Data

Jan. 29, 1993 [JP] Japan ................................. 5-014246

[51] Int. Cl.$^6$ .................................................. G06F 17/00
[52] U.S. Cl. ................................................... 364/565
[58] Field of Search ................................. 364/565, 450, 364/426.01, 478, 559, 449, 822; 280/91, 96; 180/142, 143; 342/461, 106, 107

[56] References Cited

U.S. PATENT DOCUMENTS

| | | |
|---|---|---|
| 3,790,926 | 2/1974 | Pekau .................................. 364/822 |
| 4,414,548 | 11/1983 | Carpenter et al. .................... 343/8 |
| 4,679,808 | 7/1987 | Ito et al. ............................... 280/91 |
| 4,698,775 | 10/1987 | Koch et al. ........................... 364/478 |
| 4,933,864 | 6/1990 | Evans, Jr. et al. ................... 364/449 |
| 5,075,864 | 12/1991 | Sakai ................................... 364/450 |
| 5,339,259 | 8/1994 | Puma et al. .......................... 364/559 |
| 5,373,446 | 12/1994 | Mizukoshi .......................... 364/426.01 |

FOREIGN PATENT DOCUMENTS

| | | |
|---|---|---|
| 57-68574 | 4/1982 | Japan . |
| 58-39971 | 8/1983 | Japan . |
| 59-203973 | 11/1984 | Japan . |
| 2307087 | 12/1990 | Japan . |
| 3269388 | 11/1991 | Japan . |

*Primary Examiner*—Ellis B. Ramirez
*Attorney, Agent, or Firm*—Sughrue, Mion, Zinn, Macpeak & Seas

[57] ABSTRACT

An ultrasonic measuring system detecting state informations of a vehicle other than a vehicle speed. An ultrasonic transducer TR1 directly detects the vehicle speed. A second ultrasonic transducer and a third ultrasonic transducer are disposed respectively in front of and at a back of a rotational center of the vehicle and separated from each other at a predetermined distance. They respectively transmit ultrasonic waves at right angles to the running direction of the vehicle and respectively at second and third predefined down-angles relative to the road. A two-dimensional speed of the vehicle can be measured on the basis of the speeds obtained by the transducers TR2 and TR3.

5 Claims, 8 Drawing Sheets

ULTRASONIC MEASURING SYSTEM

BACKGROUND OF THE INVENTION

1. Field Of The Invention

This invention relates to a measuring system that utilizes a variety of velocity informations, more particularly to an ultrasonic measuring system for automotive use. The measuring system may be applied to a navigation system, speed detecting system, side slip preventing system, antilock brake system, suspension system, centrifugal force detecting system, yaw velocity or yaw rate detecting system, and the like.

2. Description Of The Related Art

Japanese Published (Kokai) Utility Model Application No. 57-68574 discloses an ultrasonic speed measuring system. In this technique, a transmitter is separately provided to successively send ultrasonic waves. The waves are reflected on a reflector and successively go into a receiver. Then, Doppler frequency is measured by a difference between the transmitted waves and the received waves. This technique is well-known to those skilled in the art.

Japanese Published (Kokai) Patent Application No. 59-203973 discloses another ultrasonic speed measuring system. In this technique, one transmitter and two receivers are separately arranged as in the above mentioned technique. Particularly, these two receivers alleviate error due to pitching, nose-up or nose-down of a car body.

Japanese Published (Kokai) Patent Application No. 58-39971 also discloses an ultrasonic speed measuring system. In this technique, ultrasonic waves are transmitted in pulse form. A receiving gate corresponding to pulse width is opened when the reflected waves are received. Then, time period of a predetermined number of received waves is measured to obtain an amount of Doppler shift, thereby metering a car speed.

Japanese Published (Kokai) Patent Application No. 3-269388 discloses still another ultrasonic speed measuring system.

In this technique, a transducer radiates ultrasonic waves toward a road surface in front of or at the back of a car at a pre-defined down-angle therefrom. It is measured how long the wave takes to travel from the transducer to a protrusion of the road, on the basis of the radiated waves and input signals of the waves reflected from the protrusion. Moreover, the signal level of the reflected waves is compared with a predetermined threshold so as to detect presence of the protrusion or the like on the road in front of the car and its size. Furthermore, a current car height is measured on the basis of a radiating angle of the waves and a linear distance in the time when the reflected waves come back from the road surface thereby measuring a current speed on the basis of thus obtained Doppler frequency.

FIG. 9 is an explanatory drawing illustrating a fundamental theory of an operation of the ultrasonic measuring system that uses one ultrasonic transducer TR for transmitting and receiving the waves. In the figure:

$$L = H / \sin\phi \quad (1)$$

where: L[m] is a distance from the transducer to the road surface, H[m] is a height of the transducer, and $\phi$ [degree] is a radiating angle of the waves from the transducer.

Loss LOSS attributable to a propagation distance at that time is:

$$\begin{aligned} \text{LOSS} &= \text{(diffusion loss)} + \text{(propagation loss)} \quad (2) \\ &= 20 \cdot \text{LOG}(2 \cdot L) + 2 \cdot L \cdot \alpha [\text{dB}] \end{aligned}$$

where: $\alpha$ is an attenuation constant.

For instance:

$\alpha 100$ KHz=2.1 [dB/m]

$\alpha 200$ KHz=8.5 [dB/m]

In case ultrasonic wave beam width ($\theta$ degree) is narrowed, in the transmitted waves, their energy is more intensive thereby increasing signal components S. In the received waves, their signal-to-noise ratio (S/N) is improved for isotropic noises.

Gain G of the transmitted and received waves in total is:

$$\begin{aligned} G &= \text{(transmitted wave gain)} \times \text{(received wave gain)} \quad (3) \\ &= \{10 \cdot \log(\gamma/\theta^2)\} \times 2 \end{aligned}$$

where: $\gamma=3.4\times10^4$ (in case the beam is rotationally symmetric.)

In FIG. 9, if ultrasonic waves of a frequency f [Hz] are intermittently radiated to the road surface and Doppler frequency df [Hz] is calculated from the received wave frequency f0 (f0=f−df[Hz]):

$$df = 2f(V/3.6) \cos \phi / C [Hz] \quad (4)$$

where:

V is a car speed [Km/h], and

C is a sound velocity [m/s].

Specifically, in the above technique, the ultrasonic waves are radiated from the car toward the frontward direction and the rearward direction at the same radiation angle, and the Doppler frequency of the received signals of the reflected waves of each direction is measured. Then, a Doppler frequency of a difference between the Doppler frequencies of the frontward waves and the rearward waves is calculated so as to obtain a car speed in which a vertical speed component of a car body is canceled. A current car height is obtained from a measurement of the vertical speed component.

Thus, the measuring system detects the protrusion of the road in front of the vehicle at the time of running, utilizing the ultrasonic waves, and measures the car height and the car speed.

As described above, one of the conventional systems obtains the car height on the basis of the linear distance in the time of the reflected waves returning from the road surface and the radiation angle of the waves, thereafter calculating the car speed on the basis of thus obtained Doppler frequency. Another conventional system radiates the ultrasonic waves ahead and behind of the car at the same radiation angle so as to detect the Doppler frequencies, respectively, thereafter calculating the Doppler frequency of their differences and obtaining the car speed in which the vertical component of the car body is canceled.

However, such ultrasonic measuring apparatuses which measure the car movement using the ultrasonic waves have limited uses such as measurements for the car speed, car height and the like while they measure the speed component.

SUMMARY OF THE INVENTION

In view of the above, it is an object of the invention to provide a ultrasonic measuring apparatus that is capable of measuring a two-dimensional speed of a vehicle using ultrasonic waves.

In accordance with one preferred mode of the invention, there is provided an ultrasonic measuring apparatus for a vehicle comprising: a first ultrasonic transducer for transmitting ultrasonic waves to a road forwardly of the vehicle in a running direction of the vehicle and downwardly at a first predefined down-angle relative to the road, and receiving reflected waves from the road to provide a first speed vector; a second ultrasonic transducer and a third ultrasonic transducer, disposed respectively forwardly of and rearwardly of a rotational center of the vehicle and separated from each other at a predetermined distance, for respectively transmitting ultrasonic waves toward opposite sides of the vehicle respectively and at right angles to the running direction of the vehicle and respectively at second and third predefined down-angles relative to the road and receiving reflected waves from the road to provide second and third speed vectors; and a calculating means for calculating a two-dimensional speed of the vehicle on the basis of said speed vectors obtained by the first, second and third ultrasonic transducers.

A method, used in an ultrasonic measuring system for a vehicle composed of a first, second and third ultrasonic transducers, comprises the steps of: transmitting ultrasonic waves to a road, through the first ultrasonic transducer, forwardly of the vehicle in a running direction of the vehicle and downwardly at a first predefined down-angle relative to the road receiving reflected waves from the road and providing a first speed vector; transmitting ultrasonic waves, through the second and third ultrasonic transducers toward opposite sides of the vehicle respectively and which are disposed respectively forwardly of and rearwardly of a rotational center of the vehicle and separated from each other at a predetermined distance, at right angles to the running direction of the vehicle and respectively downwardly at second and third predefined down-angles relative to the road receiving reflected waves from the road and providing second and third speed vectors; and calculating a two-dimensional speed of the vehicle on the basis of said speed vector obtained by the first, second and third ultrasonic transducers.

Further objects and advantages of the invention will be apparent from the following description, wherein preferred embodiments of the invention are clearly shown.

BRIEF DESCRIPTION OF THE DRAWINGS

The subject matter which is regarded as the invention is set forth in the appended claims. The invention itself, however, together with further objects and advantages thereof, may be better seen in reference to the following description taken in conjunction with the accompanying drawings, in which:

DETAILED DESCRIPTION OF THE PREFERRED EMBODIMENTS

Figure 1A:
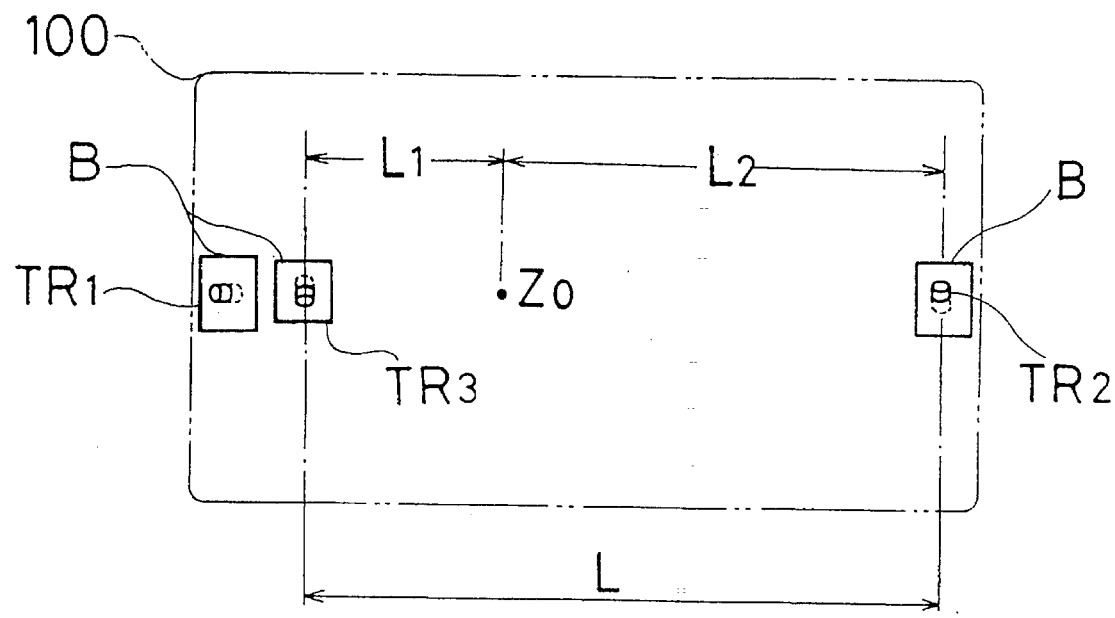
FIG. 1(a), 1(b) and 1(c) respectively show explanatory drawings of a fundamental theory of one embodiment of an ultrasonic measuring system of the invention.

Referring to the drawings, wherein like reference characters designate like or corresponding parts throughout the several views, one preferred mode of an ultrasonic measuring system of the invention will be described hereafter.

[FUNDAMENTAL THEORY]

Figure 1B:
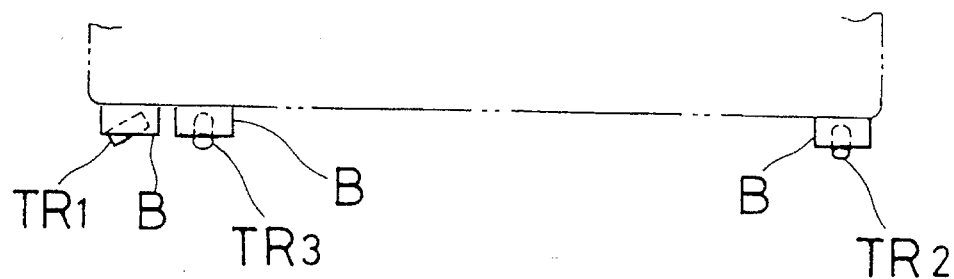
Figure 1C:
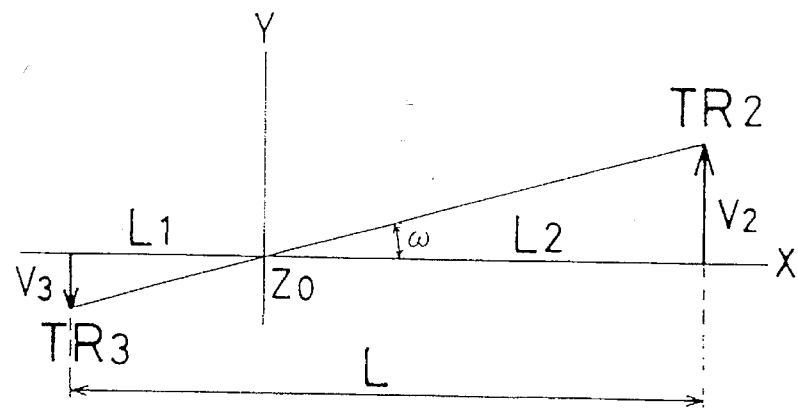

FIG. 1 shows a fundamental theory of the embodiment of the ultrasonic measuring system of the invention.

In the figure, an ultrasonic transducer TR1 is mounted on a vehicle 100 in the running direction of the vehicle 100 and at a down-angle of 45 degrees in relation to a horizontal plane. The transducer TR1 generates ultrasonic vibrations of 200 [KHz] and transmits ultrasonic waves with a fixed beam width to a road surface, and receives reflected waves from the road surface. The transducer TR1 can obtain a speed vector V1 that is parallel to the running direction of the car 100. Illustratively, the ultrasonic transducer TR1 is disposed at a center of a front of the vehicle 100. An ultrasonic transducer TR2 possesses the same property or performance as the transducer TR1. The transducer TR2 transmits a fixed beam width of ultrasonic waves toward the road surface at a down-angle of 45 degrees, and receives reflected waves from the road surface. As shown in FIG. 1(a), the transducer TR2 is disposed at right angles to a disposing direction of the transducer TR1 so as to be perpendicular with the running direction of the vehicle 100. The transducer TR2 generates a speed vector V2. Illustratively, the transducer TR2 is arranged at a rear of the vehicle 100 at a distance of L2 [m] from a rotational center Z0 of the vehicle 100. A transducer TR3 has the same performance as the transducer TR1, too, and transmits a fixed beam width of ultrasonic waves to the road surface and receives reflected waves from the road surface. The transducer TR3 is also disposed at right angles to the disposing direction of the transducer TR1. The transducer TR3 obtains a speed vector V3. Illustratively, the transducer TR3 is arranged at the front of the vehicle 100 at a distance of L1 [m] from the rotational center Z0 of the vehicle 100.

These ultrasonic transducers TR1, TR2 and TR3 are partly embedded in synthetic resin bases B as mounts, respectively. As shown in FIG. 1(b), the base B is attached to a lower surface of the front and the rear of the vehicle 100. In this embodiment, L1 shows the distance from the rotational center Z0 to the transducer TR3, L2 shows the distance from the rotational center Z0 to the transducer TR2, while L shows the distance between the transducers TR2 and TR3.

In case of obtaining a speed vector Vx, that is parallel to the running direction, a rear y-axis (lateral) speed vector Vyr and a front y-axis (lateral) speed vector Vyf, both of which are perpendicular to the vector Vx, as a two-dimensional speed of the vehicle 100:

E.x. the speed vector Vx defining a vehicle speed is:

SPEED VECTOR Vx=V1 (5)

The speed vectors Vyr and Vyf defining lateral speeds of the vehicle 100 are:

REAR LATERAL SPEED $V_{yr}=V2$ (6)

FRONT LATERAL SPEED $V_{yf}=V3$ (7)

A y-axis speed vector Xy is as follows:

$$Xy=V2-V3 \quad (8)$$

Moreover, yaw rate ω of the vehicle 100 obtained from both the lateral speed vectors V2 and V3 is:

$$\omega=(V2+V3)/L \quad (9)$$

The speed vectors shown in the expressions (5) to (9) may be differentiated and integrated so as to obtain a distance and an acceleration of each of the speed vectors Vx, Vyr and Vyf as well as a yaw angle (rotation angle) about a rotational axis (rotational center Z0) crossing the gravity center of the vehicle 100 and the yaw rate ω as an angular velocity thereof and the like. Furthermore, a yaw center can be obtained by:

$$L1=L(Vy+V3)/(V2+V3) \quad (10)$$

[CIRCUITRY OF ILLUSTRATIVE EMBODIMENT]

Figure 2:
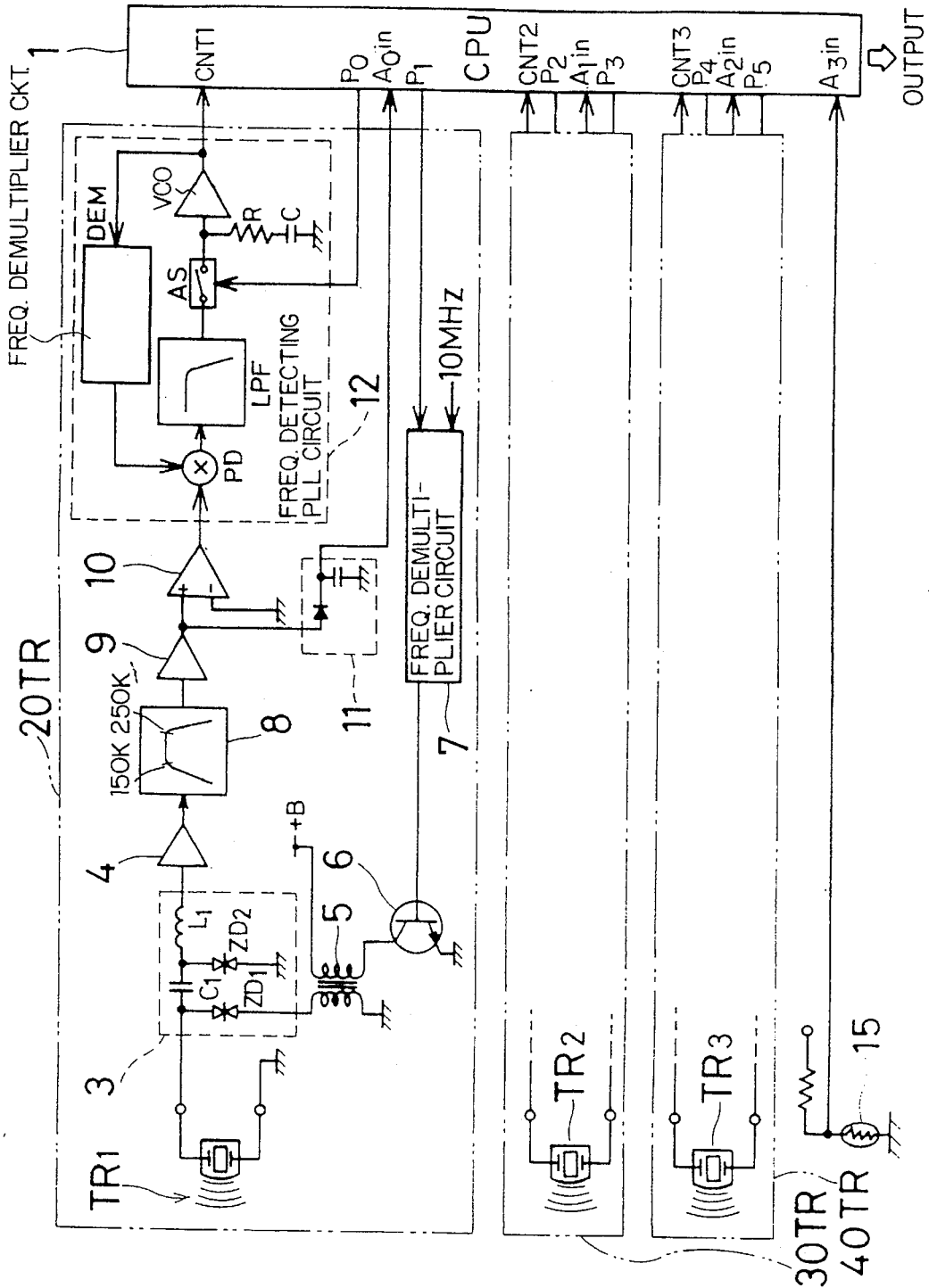
FIG. 2 is a circuit diagram of one embodiment of the ultrasonic measuring system of the invention.

FIG. 2 shows a circuitry of the illustrative embodiment of the ultrasonic measuring system.

In the figure, a microcomputer 1 has an A/D converter of 8 channel, a random access memory (RAM), a read only memory (ROM), an arithmetic and logic unit and the like provided therein. It is well-known to one skilled in the art and its functions will be described later. The transducer TR1 transmits and receives a fixed beam width of ultrasonic vibrations or waves of 200 [KHz]. A switching circuit 3 carries out a switching operation when the transducer TR1 outputs or inputs the ultrasonic vibrations. In the switching circuit 3, a Zener diode ZD1 is on to make a Zener diode ZD2 on via a condenser C1, thereby enabling the transducer TR1 generating signals therefrom. When the Zener diode ZD1 is off, since a signal therefrom is made smaller, the Zener diode ZD2 is also made off and outputs a signal, through a series resonance circuit composed of the condenser C1 and a coil L1, to a preamplifier 4.

The Zener diode ZD1 is serially connected with a secondary winding of a transformer 5. A primary winding of the transformer 5 is connected to a power source and supplies power via a switching transistor 6. A frequency multiplier circuit 7 is supplied with 10 [MHz] of an externally oscillated frequency output and outputs 100 [KHz] of rectangular waves into the switching transistor 6 so as to make the transistor 6 intermittently on and off by the signals of 100 [KHz].

Accordingly, if the microcomputer 1 supplies "1" from an intermittent output P1, the switching transistor 6 is on and off by the output of the frequency demultiplier circuit 7 thereby to generate a high voltage of 200 [KHz] at the secondary winding of the transformer 5. Thus, the transducer TR1 generates ultrasonic waves.

The signals of the transducer TR1 which is detected through the switching circuit 3 are amplified by the preamplifier 4. A band pass filter 8 corresponding to a velocity variation of the car speed and the like passes only the signals corresponding to the reflected waves among the radiated waves. The passed signals are further amplified by an amplifier 9 and inputted into a comparator 10 to undergo binary processing. Part of inputs of the comparator 10 is inputted into a receiving level detecting circuit 11, and an output thereof is inputted into the A/D converter of the microcomputer 1.

Output signals of the comparator 10 is inputted into a frequency detecting PLL circuit 12. The PLL circuit 12 outputs a number of repetition pulses that is proportional to the output of the comparator 10.

More in detail, since the output of the comparator 10 is very low and a frequency of approximately tens [KHz], the PLL circuit 12 is used as a frequency multiplying circuit so as to make the output of the comparator 10 available for a vehicle speed and obtain a resolution in a short time. Since the output of the comparator 10 is significant only while the receiving gate is open, the PLL circuit 12 samples and holds a frequency by a time signal during that time. When the receiving gate is closed and not active, the frequency detecting PLL circuit 12 stops the function as the PLL circuit and holds the voltage which has been sampled and held.

Specifically, a phase difference detecting circuit PD compares pulses from a frequency demultiplier circuit DEM with the output from the comparator 10. The phase difference therebetween is transferred to an analog switching circuit AS. The output of the analog switching circuit AS is inputted into a resistor R and a condenser C for sample-and-hold processing and also into the microcomputer 1 through a voltage control oscillator circuit VCO. The output of the voltage control oscillator circuit VCO is demultiplied into one eighth by the frequency demultiplier circuit DEM and inputted into the phase difference detecting circuit PD through the frequency demultiplier circuit DEM. As a result, repetition pulses of eightfold frequency are inputted into the microcomputer 1 from the voltage control oscillator circuit VCO.

An outside air temperature is detected by a thermistor 15 and inputted into a terminal of the A/D converter contained in the microcomputer 1.

An ultrasonic transducer circuitry 20TR is constituted by a transmitting circuitry for ultrasonic waves and a receiving circuitry for the ultrasonic waves, the transmitting circuitry being composed of the ultrasonic transducer TR1, the switching circuit 3, the transformer 5, the switching transistor 6 and the frequency demultiplier circuit 7, and the receiving circuitry being composed of the ultrasonic transducer TR1, the switching circuit 3, the preamplifier 4, the band pass filter 8, the amplifier 9, the comparator 10, the receiving level detecting circuit 11 and the frequency demultiplier PLL circuit 12.

An ultrasonic transducer circuitry 30TR contains the ultrasonic transducer TR2 while an ultrasonic transducer circuitry 40TR contains the ultrasonic transducer TR3. They have the same circuitry as the transducer circuitry 20TR and their circuitry is not shown in detail to avoid redundancy.

Figure 3:
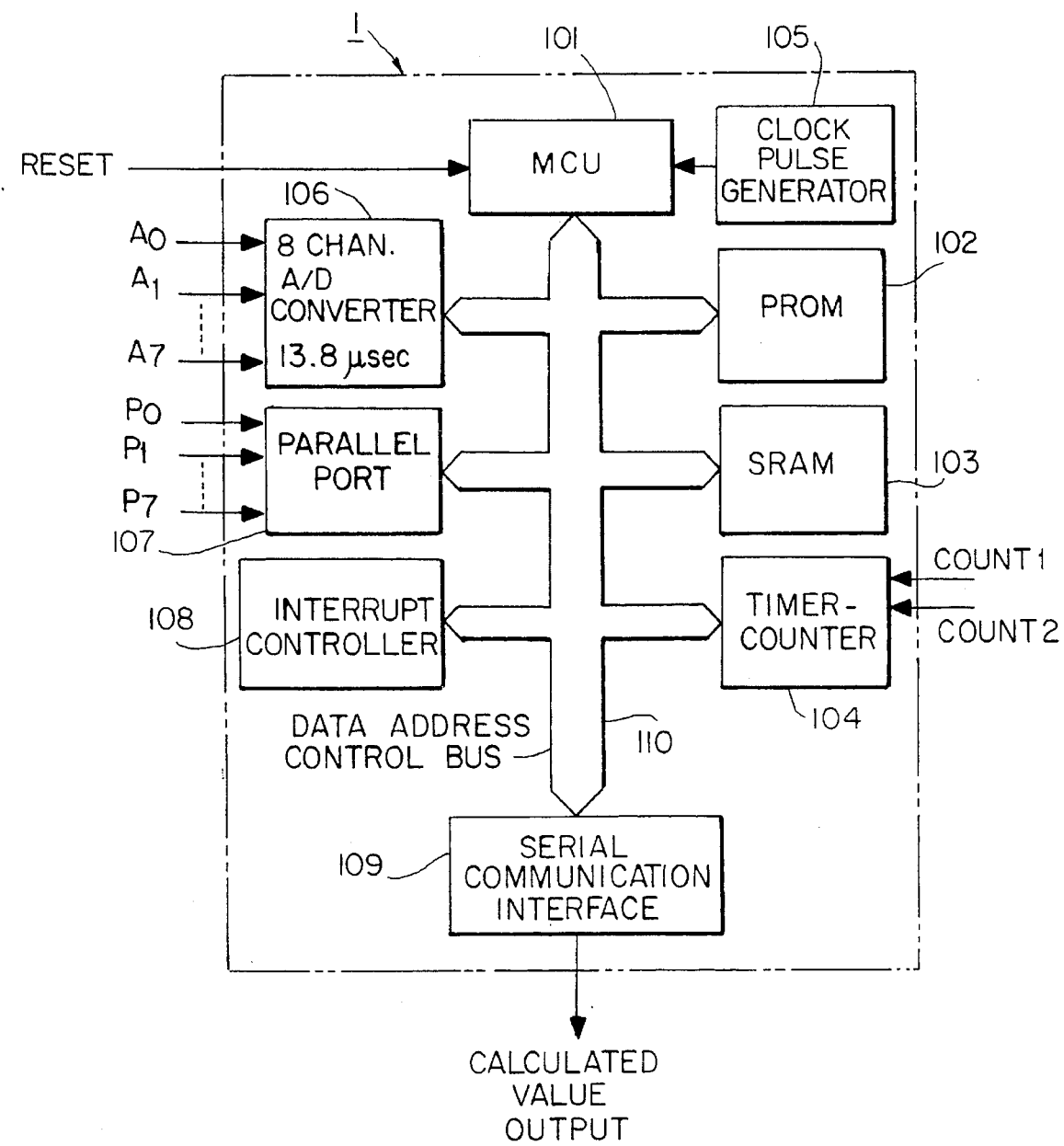
FIG. 3 is a block diagram of a microcomputer used in a circuitry of FIG. 2.

FIG. 3 illustrates function blocks of the microcomputer 1.

In the figure, the microcomputer 1 contains a main control unit (MCU) 101 which is driven by a clock pulse generator 105. The microcomputer 1 further contains a programmable read only memory (PROM) 102, a static random access memory (SRAM) 103, a timer-counter 104, an A/D converter 106, a parallel port 107, interrupt controller 108, a serial communication interface 109 and the like. The PROM 102 stores a program for controlling the operation of the microcomputer 1. The SRAM 103 stores data that the main control unit 101 needs in the control work. The timer-counter 104 has a counting function as a timer and a counter. The A/D converter 106 provides external analog inputs of 8 channel. The parallel port 107 provides external digital inputs. The interrupt controller 108 carries out an interruption control. The serial communication interface 109 serially outputs computed values of the vehicle speed. They are connected with each other through a data-address-control bus 110.

[GENERAL BASIC OPERATION OF CIRCUITRY]

The ultrasonic transducer circuitries 20TR, 30TR and 40TR operate as follows. Since the basic operation thereof is the same, the description will be made hereunder mainly with respect to the circuitry 20TR. Still, as a matter of course, the circuitries 30TR and 40TR are controlled in common or independently in the same manner.

Gate signals are outputted from a terminal P1 of the parallel port 107 of the microcomputer 1 so that the transducers TR1, TR2 and TR3 transmit burst waves each having a frequency of 200 [KHz] and a duration of 1 [msec], at 10 [msec] intervals therefrom. The switching transistor 6 undergoes on-off control by the outputs from the frequency demultiplier circuit 7 so as to generate ultrasonic waves from the transducers TR1, TR2 and TR3 by the boosted outputs of 200 [KHz]. Here, the switching circuit 3 is designed such that it does not apply an excessive signal to the input of the preamplifier 4 at the receiving side during transmitting operation.

In this operation, the ultrasonic wave outputting work of the transducer TR1 and the transducers TR2 and TR3 may be performed at the same time or by time division. In the illustrative embodiment, since there is few possibility of mutual intervention, the ultrasonic waves are outputted simultaneously from the transducers TR1, TR2 and TR3.

Each of the transducers TR1, TR2 and TR3 receives the reflected waves from the road surface. The received signals are amplified approximately to 80 [dB] through the preamplifier 4. The amplified signals enter the band pass filter 8 and only the signals of approximately 200±50 [KHz] are passed therethrough. The passed signals are further amplified by the amplifier 9 and made binary by the comparator 10. Then, the binary signals are inputted into the frequency detecting PLL circuit 12 to obtain a frequency of the reflected waves from the road surface. The signals outputted from the comparator 10 are sampled and held through the PLL circuit 12 only during the time when a predefined reflected waves from the road surface are detected. A predefined detected frequency of the reflected waves is held by holding that voltage. The output signals of the voltage control oscillating circuit VCO are demultiplied into one eighth and fed back to the phase difference detecting circuit PD so as to be locked in a frequency eight times as frequent as that of the reflected waves that are inputted into the transducers TR1, TR2, TR3. Accordingly, if the output signals from the voltage control oscillating circuit VCO are counted by the counter in the microcomputer 1, a Doppler frequency can be measured on the basis of the frequencies of the radiated waves and the reflected waves. In this embodiment, a resolution of about 0.5 [Km/h] or more is obtained in terms of the vehicle speed.

[MAIN CONTROL OPERATION BY MICROCOMPUTER]

Figure 4:
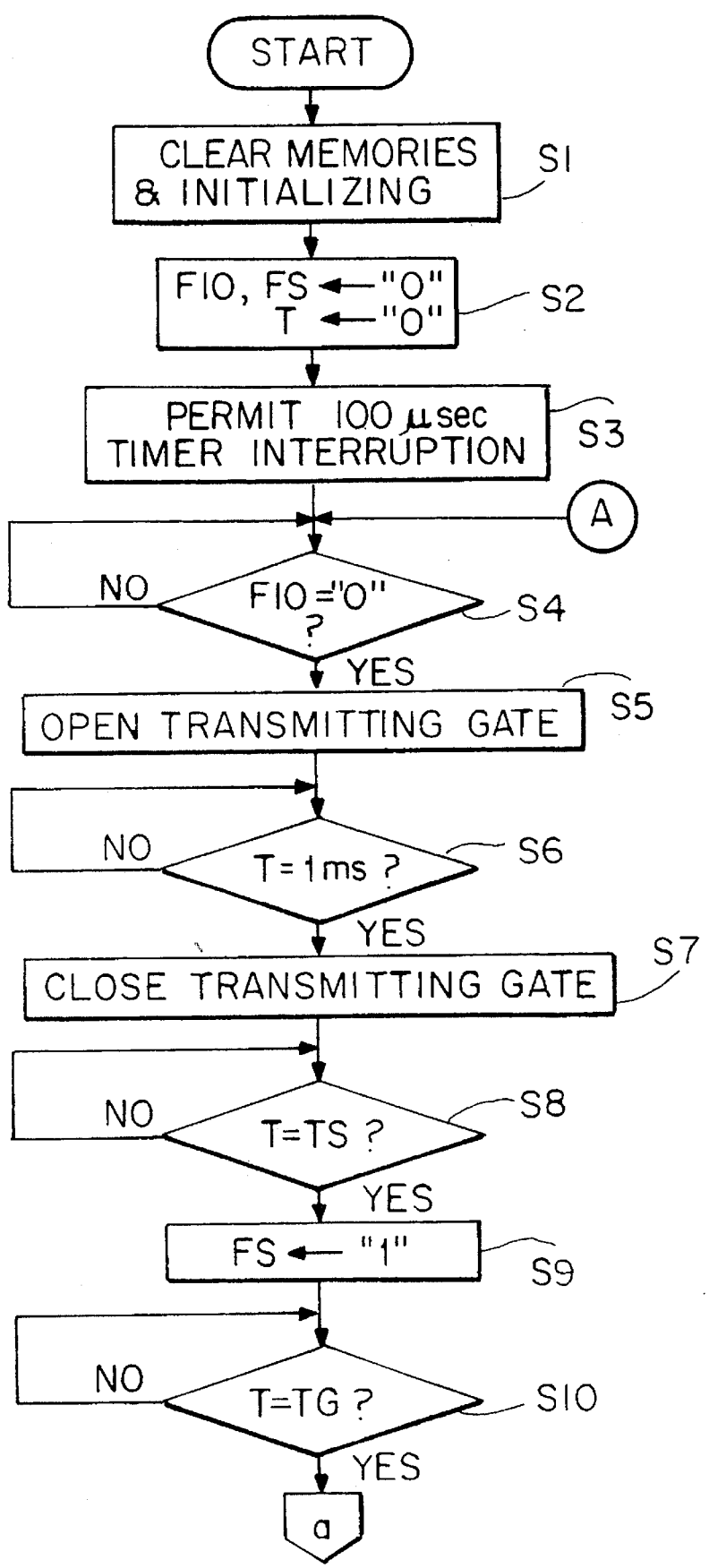
FIG. 4 is a flowchart showing part of a main program executed by the microcomputer of FIG. 3.
Figure 5:
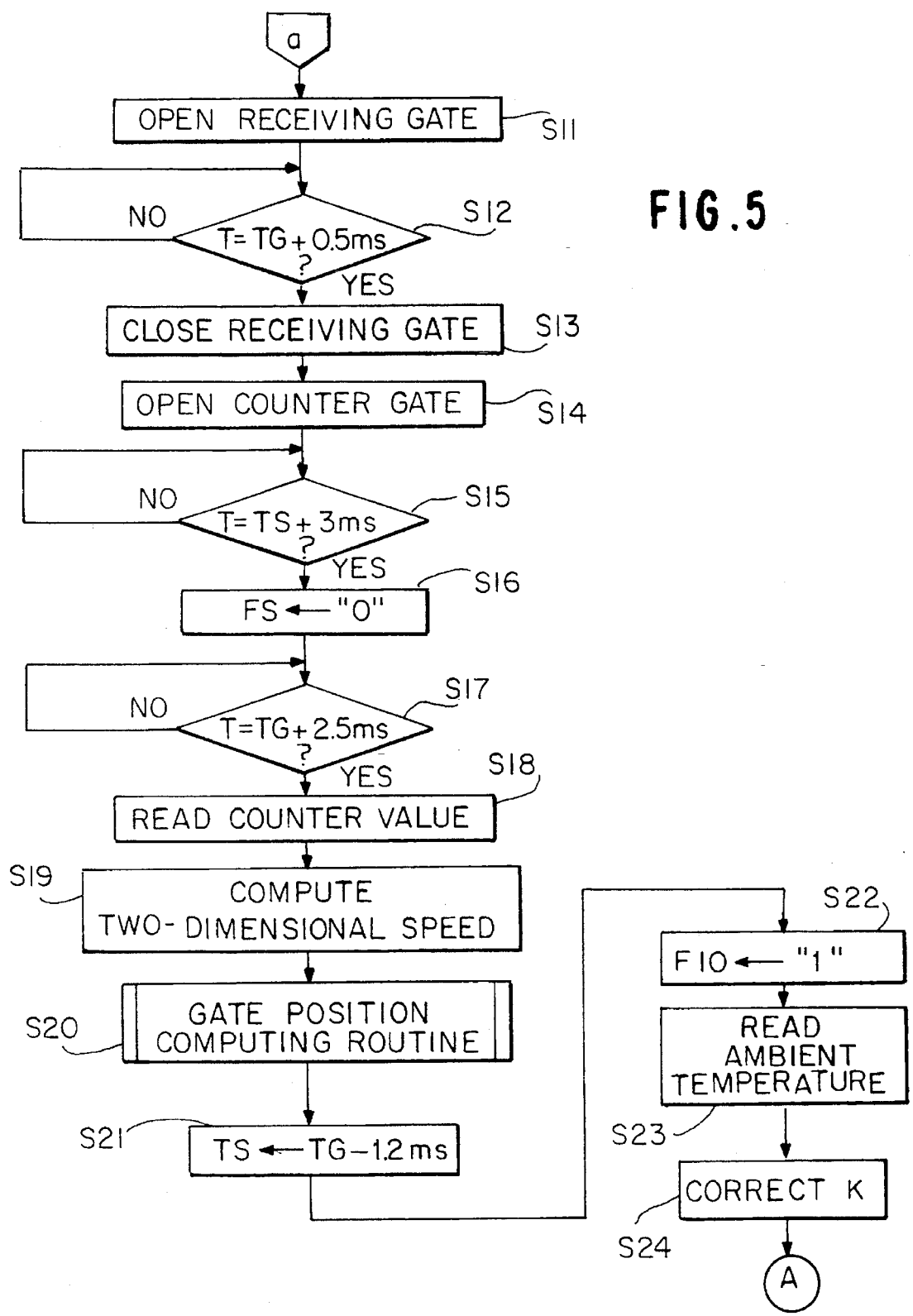
FIG. 5 is a flowchart showing another part of the main program executed by the microcomputer of FIG. 3.
Figure 7:
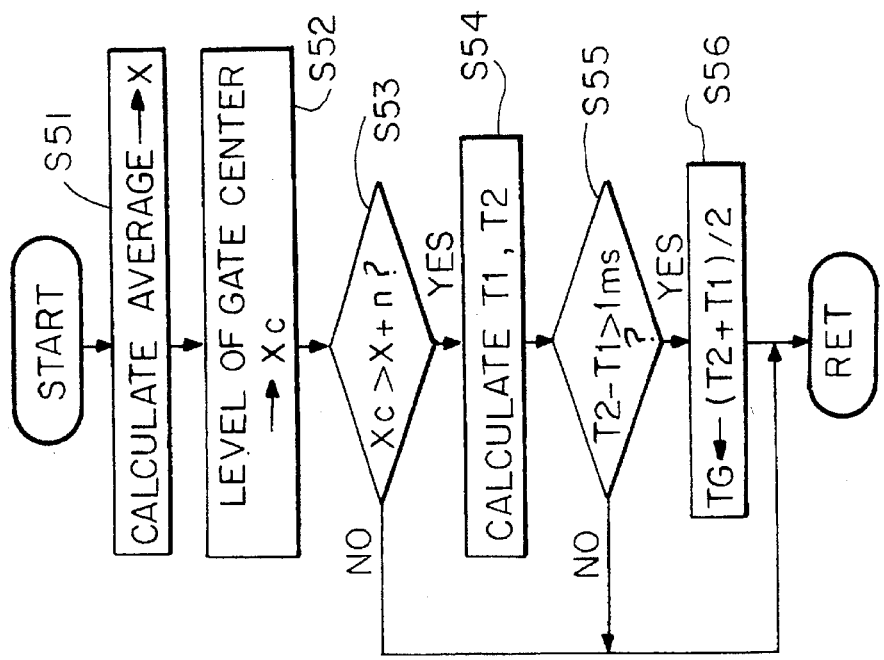
FIG. 7 is a flowchart showing a gate position control routine executed by the microcomputer of FIG. 3.
Figure 6:
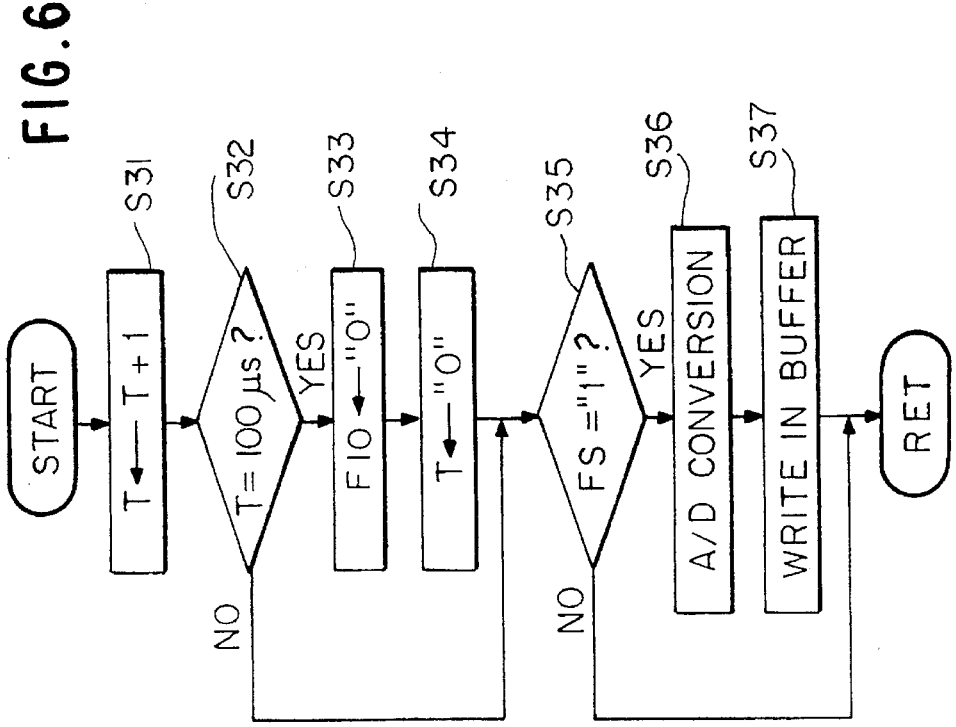
FIG. 6 is a flowchart showing an interruption routine executed by the microcomputer of FIG. 3.

FIGS. 4 and 5 show a flowchart of a main program executed by the microcomputer 1. FIG. 6 is a flowchart of an interruption routine executed by the microcomputer 1. FIG. 7 is a flowchart of a gate position control executed by the microcomputer 1.

Figure 8:
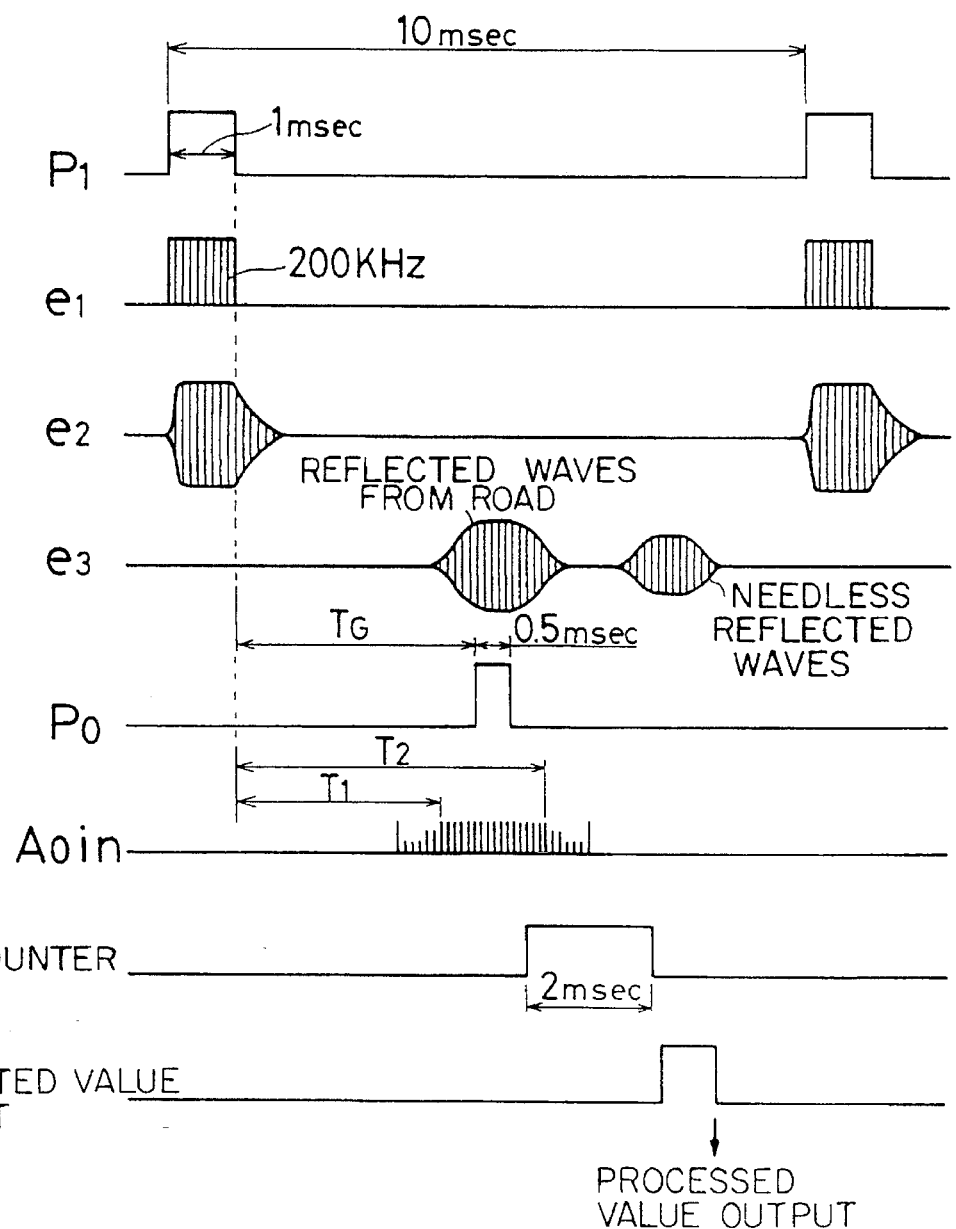
FIG. 8 is a timing chart of the gate position control routine of FIG. 7.
Figure 9:
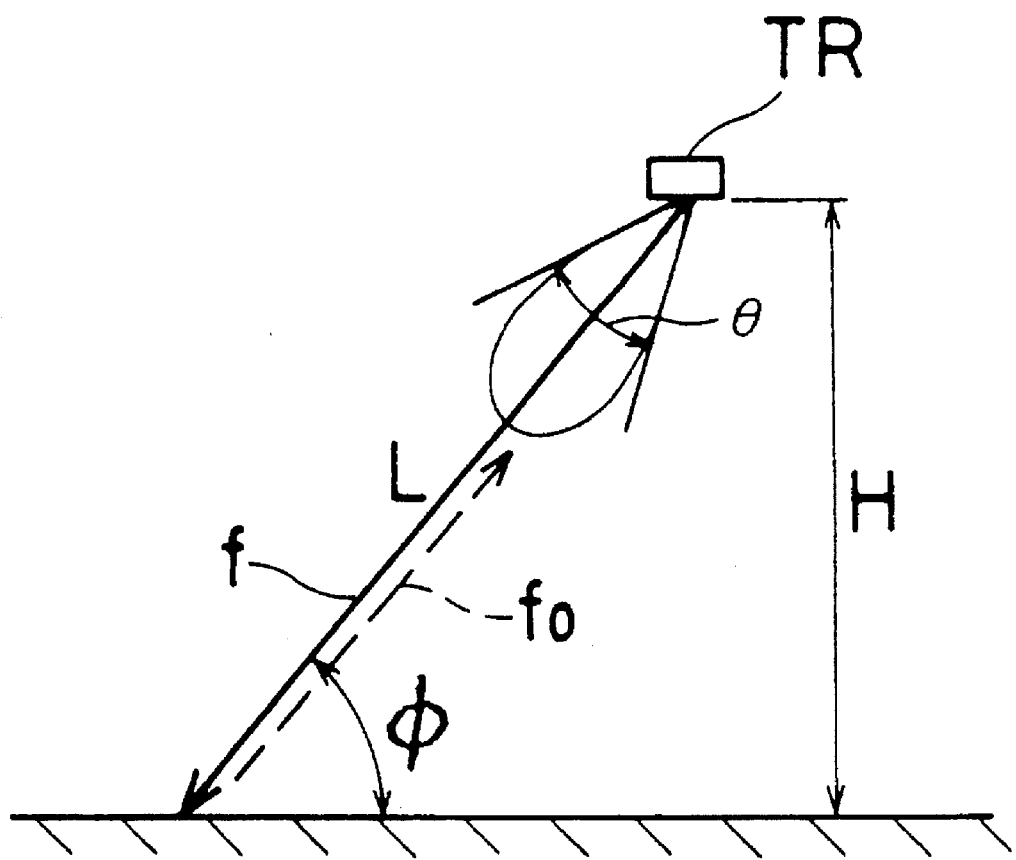
FIG. 9 is an explanatory drawing of a fundamental theory of a conventional ultrasonic measuring system that has one transducer for transmitting and receiving ultrasonic waves.

FIG. 8 is a timing chart in the control operation of the illustrated embodiment of the ultrasonic measuring system. Basic operations of the transducer circuitries 20TR, 30TR and 40TR are the same, and the control operation of the transducer circuitry 20TR will be mainly described hereunder. However, as a matter of course, the transducer circuitries 30TR and 40TR are controlled in the same manner.

If a power supply is made on, a power-on reset circuit is operated to input a reset pulse in the main control circuit 101. Then, the main control circuit 101 is resetted and starts the main program processing of FIGS. 4 and 5 which is stored in the PROM 102.

Entering the main program, execution first proceeds to a step S1. This step S1 clears or sets into a predetermined value a variety of memories, counter and timer used for the transducer circuitries 20TR, 30TR and 40TR, and initializes each of the output ports and the like. Particularly, the step S1 sets a receiving gate start time TG and a sampling start time Ts. The step S1 sets, for this receiving gate start time TG, a receiving time of the ultrasonic wave signals corresponding to a mounting height of the transducers TR1, TR2 and TR3 on the vehicle 100 in a standard state as a predefined value. For example, if the mounting height is 280 [mm], the radiation angle of the ultrasonic waves is 45 degrees, and the sound speed C equals 345 [m/s], the receiving gate start time TG is set as follows:

$$TG=2\times 0.28/\sin 45\times 1/345+0.3\times 10^{-3}=2.6 \text{ [msec]}$$

where: 0.3 [msec] is added so as to set the position of a receiving gate width 0.5 [msec], corresponding to a transmitted wave pulse width 1 [msec], approximately at a center of the received wave.

Then, execution proceeds to a step S2. The step S2 clears a 10 msec sequence ending flag F10 that determines an ending of a 10 msec sequence, a sampling permitting flag Fs and a main timer T. Execution proceeds to a step S3 thereafter, and the step S3 permits 100 μsec timer interruption which carries out interruptions every 100 [μ sec]. Execution then proceeds to a step S4, and the step S4 determines if the 10 msec sequence ending flag F10 is taken down or not. The step S4 stands by until the 10 msec sequence ending flag F10 is taken down, and executes following processing every 10 [msec]. If the 10 msec sequence ending flag F10 is taken down, the step S4 routes execution to a step S5 via its YES path. The step S5 switches on the switching transistor 6 to open the transmitting gates of the transducer circuitries 20TR, 30TR and 40TR. Execution then proceeds to a step S6, and the step S6 determines if 1 msec has elapsed or not through the main timer T. If the 1 msec has elapsed, the step S6 routes execution, via its YES path, to a step S7. The step S7 closes the transmitting gates of the transducer circuitries 20TR, 30TR and 40TR. Then, 1 [msec] of ultrasonic burst signal is outputted. Namely, as shown in FIG. 8, the Steps S4 to S7 execute the opening of the transmitting gate in response to "1" signals each of which has a duration of 1 [msec] and which are repeatedly generated every 10 [msec] from the output terminal P1 of the microcomputer 1. The burst signals are generated during that time as shown by outputs e1 of the frequency demultiplier circuit 7, and the transmitting wave inputs of the transducers TR1, TR2 and TR3 are as shown by outputs e2. The reflected waves have outputs as shown by e3 through the transducers TR1, TR2 and TR3.

During the steps S1 to S7, the transducer circuitries 20TR, 30TR and 40TR are simultaneously controlled in case of simultaneously transmitting the ultrasonic waves. However, since predicted sampling start times Ts, for inputting the reflected waves into each of the transducer circuitries 20TR, 30TR and 40TR, are different, the transducer circuitries 20TR, 30TR and 40TR are individually controlled. Still, in this illustrative embodiment, description of the common matters will be eliminated in order to avoid complication.

When execution proceeds to a step S8, this step S8 determines if the predicted sampling start time Ts has come or not for inputting the reflected waves into each of the transducer circuitry 20TR (the transducer circuitry 30TR, 40TR). If the sampling start time Ts has come, the step S8 routes execution, via its YES path, to a step S9. The step S9 puts up the sampling permitting flag Fs. Execution then proceeds to a step S10, and the step S10 determines if each of the receiving gate start time TG, which are obtained by the initialized value or in the gate position computing routine, has come or not. If each of the receiving gate start time TG has come, the step S10 routes execution, via its YES path, to a step S11. The step S11 opens the receiving gate of the transducer circuitry 20TR (the transducer circuitry 30TR, 40TR). Execution then proceeds to a step S12, and the step S12 makes the receiving gate on only for 0.5 [msec]. Thereafter, execution proceeds to a step S13, and the step S13 makes the receiving gate off and enters an execution of step S14. Namely, the steps S8 to S13 determine if the receiving gate start time TG of each transducer circuitry 20TR, 30TR, 40TR has come or not, and opens and closes the receiving gate, that passes the reflected ultrasonic waves, for each transducer circuitry 20TR, 30TR, 40TR.

Execution then proceeds to a step 14, and the step 14 opens a gate of a counter COUNT1 (COUNT2, COUTN3) contained in the main control circuit 101. Thereafter, execution proceeds to a step S15, and the step S15 determines if 3 [msec] has elapsed from the sampling start time Ts or not. Namely, in response to the sampling start time Ts, signals from the transducer circuitry 20TR (30TR, 40TR) are inputted into a terminal A0in (A1in, A2in) of the A/D converter contained in the microcomputer 1 for ±1.5 [msec] from the center of on-time of the receiving gate, and sampling of the inputted signals is executed. If 3 [msec] has elapsed from each sampling start time Ts, the step S15 routes execution, via its YES path, to a step S16. The step S16 takes down the sampling permitting flag Fs. Execution then proceeds to a step S17, and the step S17 determines through the main timer T if on-time of the counter has a duration of 2.5 msec from the receiving gate start time TG for each transducer circuitry 20TR (30TR, 40TR) or not. If the on-time of the counter has a duration of 2.5 msec, the step S17 routes execution, via its YES path, to a step S18. The step S18 reads a counted value of the counter and closes the gate of the counter. Execution then proceeds to a step S19, and the step S19 performs a computing operation of a two-dimensional speed and the like.

Namely, the calculation of the speed V [Km/h] is carried out while making each speed V1, V2, V3 as follows:

V1=K·countX1

V2=K·countX2

V3=K·countX3 where: countX1, countX2 and countX3 respectively show a coefficient of the counter, and K is a coefficient determined by the ambient temperature.

Then, necessary expressions such as the above mentioned expressions (5) to (7) are calculated. Moreover, the distance and the acceleration can be calculated by integrating and differentiating the speed vectors from these expressions. If the rear lateral speed vector Vyr and the front lateral speed vector Vyf of the vehicle 100 are obtained, a centrifugal force applied to the vehicle 100 and the like can be calculated. As a matter of course, the rotational angular velocity around the center axis passing through the gravity center of the vehicle 100, namely the yaw rate can be calculated.

Execution then proceeds to a step S20, and the step S20 calls the gate position computing routine. Execution then proceeds to a step 21, and the step S21 sets a sampling time for a sampling start time Ts at a time point of 1.2 [msec]prior to a receiving gate start time TG. Namely, the gate position computing routine determines a next receiving gate start time TG. Execution then proceeds to a step S22, and the step S22 puts up a 10 msec sequence ending flag F10. Thereafter, execution proceeds to a step S23, and the step S23 reads the ambient temperature. Then, execution proceeds to a step S24, and the step S24 corrects and determines a proportional constant K used in a next calculating operation of the vehicle speed. Thereafter, the routine from the step S4 to the step S24 is repeatedly executed.

[TIMER INTERRUPTING OPERATION OF MICROCOMPUTER]

Upon entry into this routine, execution proceeds to a step S31, and the step S31 increases "+1" for the main timer T. Execution then proceeds to a step S32, and the step S32 determines through the main timer T if now is the time for interruptions, which are carried out every 100 [µ sec], or not. If the step S23 determines that the current time is the interruption time, this step S23 routes execution, via its YES path, to a step S33 and a step S34. The step S34 takes down the 10 msec sequence ending flag F10, which determines an end of the 10 [msec] of sequence, and clears the main timer T. If the step S32 determines that the current time is not the interruption time, the step S32 avoids the steps S33 and S34, and routes execution, via its NO path, to a step S35.

The step S35 determines if the sampling permitting flag Fs is put up or not. If the sampling permitting flag Fs is put up, the step S35 routes execution, via its YES path, to a step S36. The step S36 begins A/D conversion through outputs of the receiving level detecting circuit 11. Execution then proceeds to a step S37, and the step S37 writes the converted digital data into a buffer and this routine is exited. If the step S35 determines that the sampling permitting flag Fs is not put up, this routine is also exited.

Namely, in this routine, a signal level is sampled through the signal level detecting circuit 11 at 0.1 [msec] intervals using the main timer T, and that signal level is stored in the buffer contained in the main control circuit 101.

[GATE POSITION CONTROL OPERATION OF MICROCOMPUTER]

The number of the received signal level data that have been sampled by the interrupting sampling at 0.1 [msec] intervals is 31 in total, namely, 15 sample data respectively at before and after the center sample data. Upon entry in this routine, as shown in FIG. 7, execution proceeds to a step S51, and the step S51 calculates an average X by simply averaging all the level data. Execution then proceeds to a step S52, and the step S52 stores a level value of the center sample data of the received signal level data into a center sample data memory Xc. Execution then proceeds to a step S53, and the step S53 determines if the stored level value Xc of the center sample data (and the level value of the 15 level data respectively provided at before and after the center data) is larger than a value of a predefined average X added with a predetermined amount n. If the S53 determines that the level value Xc of the center sample data and the level value of the 15 level data respectively provided at before and after the center data are larger than the value X+n, it means the data in which desired waves are reflected in good order, so that execution proceeds to a step S54 so as to accept these data. However, if the S53 determines that the level value Xc of the center sample data and the level value of the 15 level data respectively provided at before and after the center data are not larger than the value X+n, it means the data in which the received wave form is distorted due to random interference, so that this routine is exited via NO path of the step S53 so as to prevent these data from being accepted. The step S53 routes execution, via its YES path, to a step S54, and the step S54 searches a time period of data that exceed the value of the average X of all the level data added with the predetermined amount n, thereby obtaining a previous time T1 and an after time T2. Execution then proceeds to a step S55, and the step S55 determines if the amplitude T2–T1 is more than 1 [msec] and covers sufficiently the time for obtaining the received signal level data or not. This is also for preventing acceptance of data in which the received wave form has been distorted due to random interference. The step S55 routes execution, via its YES path, to a step S56, and the step S56 sets the time (T2+T1)/2 as the receiving gate start time TG. If the amplitude T2–T1 is not larger than 1 [msec] and does not sufficiently cover the time for obtaining the received signal level data, this step is exited via NO path of the step S55.

As described above, the ultrasonic transducer TR1 serves for a first ultrasonic transducer to obtain the speed V1 in the running direction of the vehicle 100 so as to directly accept it as a vehicle speed.

Moreover, the ultrasonic transducer TR2 serves for a second ultrasonic transducer, the ultrasonic transducer TR3 serves for a third ultrasonic transducer, and the step S19 serves for a calculating means to calculate a two-dimensional speed of the vehicle 100 from the speeds obtained by the first, second and third transducers mounted on the vehicle 100.

The ultrasonic transducer TR2 as the second ultrasonic transducer obtains the speed V2 in the direction shifted 90 degrees relative to the vehicle speed V1. The ultrasonic transducer TR3 as the third ultrasonic transducer obtains the speed V3 in the direction shifted 90 degrees relative to the vehicle speed V1.

Providing that the speed V1 as the vehicle speed obtained by the transducer TR1 is an x-axis speed component, the speed V2 is a y-axis speed component that is perpendicular to a line parallel to the running direction of the vehicle 100, namely, this y-axis speed component means a lateral speed of the vehicle 100. Moreover, by giving a predefined distance L between the rotational center Z0 of the vehicle 100 and the second transducer TR2, a rotational speed difference between right and left wheels represents the speed V2.

Accordingly, in calculating the speed in the step S19 as the calculating means of the illustrative embodiment, the speed Vx in the running direction of the vehicle 100, the rear lateral speed vector Vyr and the front lateral speed vector Vyf can be obtained by the two-dimensional speed components of the x-axis speed component and the y-axis speed component, thereby providing a yaw angle. A yaw rate can be obtained by calculating the moving speed of the yaw angle. Moreover, a distance and an acceleration can be obtained by integrating and differentiating the speed vectors.

Therefore, by use of thus obtained two-demensional speed components, the technique of the illustrative embodiment can be applied to a measuring or control system that uses a variety of speed information: such as a navigation system that corrects a moving distance and a moving direction, a speed detecting system for a vehicle speed and a lateral speed and the like, a side slip preventing system, an antilock brake system (ABS) that corrects a yaw rate or rotation difference between the right and left wheels, a suspension system that corrects a yaw rate or adjusts a height between the road at right and left wheels and the vehicle, etc.

Particularly, the illustrative embodiment arranges the third transducer TR3 at a predetermined distance L1 in front of the rotational center Z0 of the vehicle 100, and the second transducer TR2 at a predetermined distance L2 at the back of the rotational center Z0, so that, an expression for calculating the yaw angle is as shown by the equation (7) that represents a total of the speed V2 and the speed V3 obtained by the transducers TR2 and TR3. Therefore, the lateral speeds perpendicular to the running direction of the vehicle 100 can be calculated with a high accuracy.

A two-dimensional vehicle speed is detected by the transducers TR1, TR2 and TR3 in the illustrative embodiment. However, since the sound speed is not so fast as to be ignored relative to the vehicle speed, there arises a shift between a beam in transmitting waves and a beam in receiving waves in case of narrowing the width of the ultrasonic wave in order to raise a total gain of the transmitting and receiving waves. Therefore, reflected waves may be received by an ultrasonic transducer for measuring a speed at the time of low speed driving or an ultrasonic transducer for measuring a speed at the time of high speed driving. Moreover, the ultrasonic transducer circuitries 20TR, 30TR and 40TR may be respectively provided with two transducers. Or one of the two transducers for each transducer circuitry may be used exclusively for receiving the ultrasonic waves. Particularly, the transducer circuitry 20TR, for detecting the speed parallel to the running direction of the vehicle 100, may be two ultrasonic transducers or an ultrasonic transducer and a ultrasonic receiver, and a receiving position for the reflected waves may be changed according to the vehicle speed. In this case, a measured speed has a high accuracy and reliability.

While the transducer TR1 is disposed at the front of the vehicle 100 and the transducer TR2 is disposed at the rear thereof in the illustrative embodiment, the transducer TR1 may be disposed at any position so long as it is parallel to the running direction of the vehicle 100. The predefined distance L between the transducers TR2 and TR3 may be a desired value so long as they are separated by a predefined distance L while the connecting line thereof passes through the rotational center Z0 of the vehicle 100. However, the larger is the predefined distance L, the larger is the detectable speed and the higher is the detecting accuracy. Moreover, if the transducer TR1 is disposed at a middle position of the vehicle 100, the reliability for the vehicle speed is the highest.

While the above embodiment is described with respect to the vehicle speed measurement, the ultrasonic measuring system of this invention may be applied, by use of speed components, to any type of measuring or control system that uses a variety of speed information: such as a navigation system, speed detecting system, side slip preventing system, antilock brake system, suspension system, etc.

The preferred embodiments described herein are therefore illustrative and not restrictive, the scope of the invention being indicated in the appended claims and all variations which come within the meaning of the claims are intended to be embraced therein.

What is claimed is:

1. An ultrasonic measuring apparatus for a vehicle comprising:

a first ultrasonic transducer for transmitting ultrasonic waves to a road forwardly of the vehicle in a running direction of the vehicle and downwardly at a first predefined down-angle relative to the road, receiving reflected waves from the road and providing a first speed vector;

a second ultrasonic transducer and a third ultrasonic transducer, disposed respectively forwardly of and rearwardly of a rotational center of the vehicle and separated from each other at a predetermined distance, for respectively transmitting ultrasonic waves toward opposite sides of the vehicle respectively and at right angles to the running direction of the vehicle and respectively at second and third predefined down-angles relative to the road and receiving reflected waves from the road to provide second and third speed vectors; and a calculating means for calculating a two-dimensional speed of the vehicle on the basis of the speed vectors obtained by the first, second and third ultrasonic transducers.

2. An ultrasonic measuring apparatus according to claim 1, in which the second ultrasonic transducer is disposed at a first fixed distance from the rotational center while the third ultrasonic transducer is disposed at a second fixed distance from the rotational center, the rotational center being disposed on a line connecting the second and third ultrasonic transducers.

3. An ultrasonic measuring apparatus according to claim 1, in which the first ultrasonic transducer is disposed at a center in a width direction of the vehicle.

4. An ultrasonic measuring apparatus according to claim 1, in which the second and third ultrasonic transducers are disposed at a center in a width direction of the vehicle.

5. A method, used in an ultrasonic measuring system for a vehicle composed of first, second and third ultrasonic transducers, comprising the steps of:

transmitting ultrasonic waves to a road, through the first ultrasonic tranducer forwardly of the vehicle in a running direction of the vehicle and downwardly at a first predefined down-angle relative to the road, receiving reflected waves from the road and providing a first speed vector;

transmitting ultrasonic waves, through the second and third ultrasonic transducers toward opposite sides of the vehicle respectively and which are disposed respectively forwardly of and rearwardly of a rotational center of the vehicle and separated from each other at a predetermined distance, at right angles to the running direction of the vehicle and respectively downwardly at second and third predefined down-angles relative to the road, receiving reflected waves from the road and providing second and third speed vectors; and calculating a two-dimensional speed of the vehicle on the basis of said speed vectors obtained by the first, second and third ultrasonic transducers.

* * * * *